UNITED STATES PATENT OFFICE.

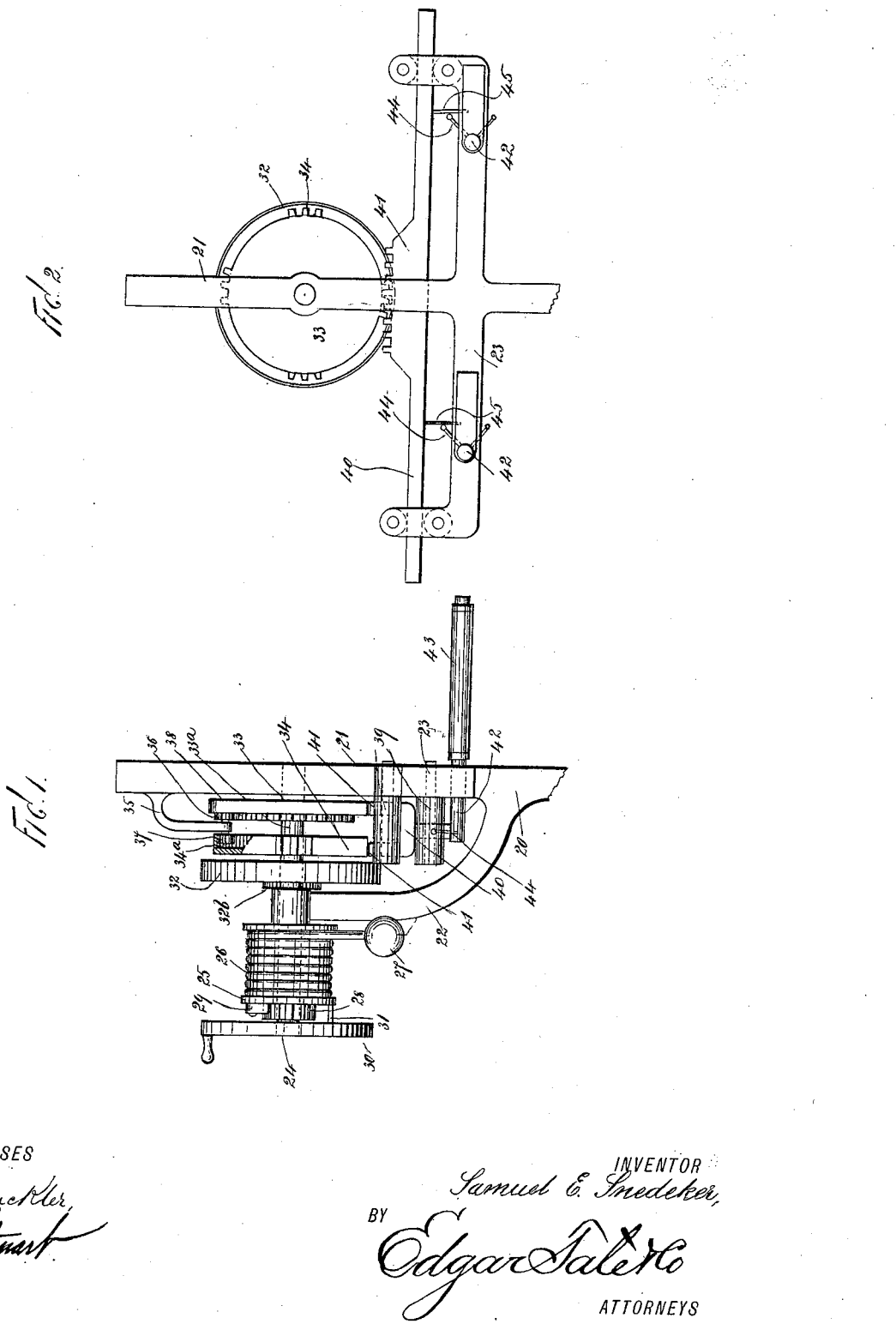

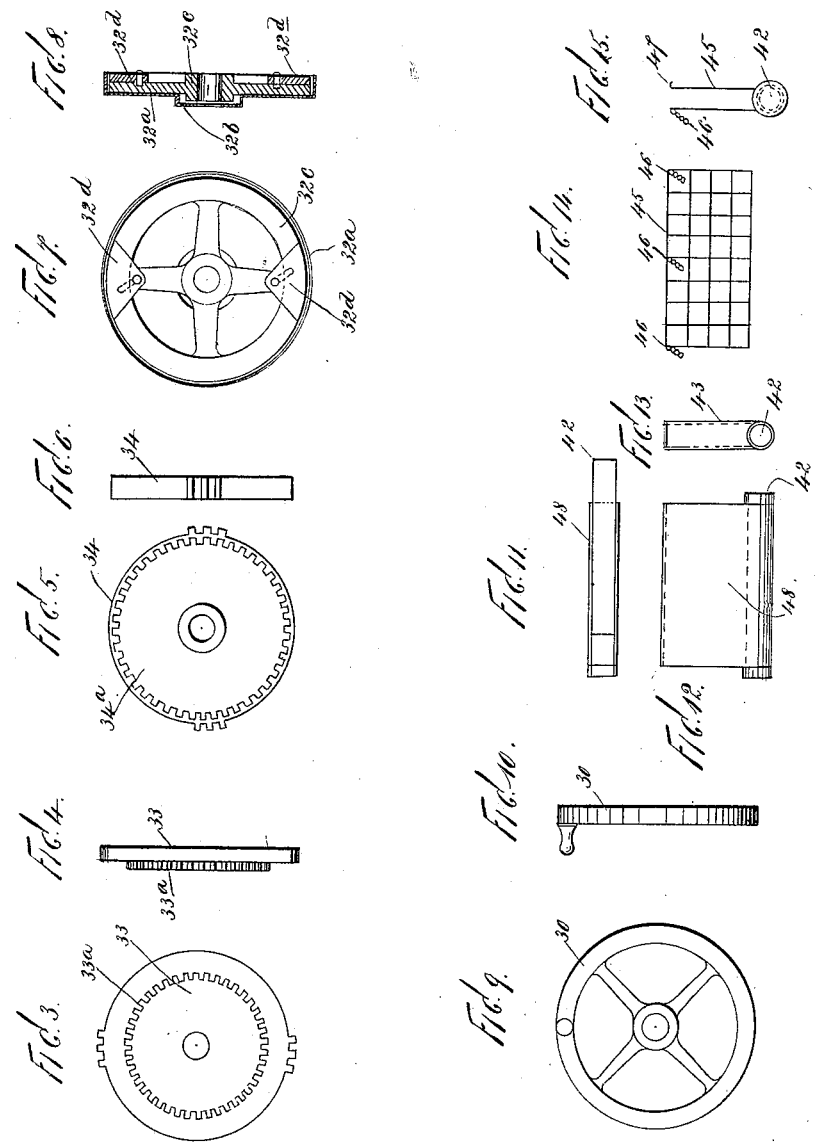

SAMUEL EDGAR SNEDEKER, OF WHITE PLAINS, NEW YORK.

COOKING APPARATUS.

SPECIFICATION forming part of Letters Patent No. 651,149, dated June 5, 1900.

Application filed January 17, 1900. Serial No. 1,721. (No model.)

*To all whom it may concern:*

Be it known that I, SAMUEL EDGAR SNEDEKER, a citizen of the United States, residing at White Plains, in the county of Westchester and State of New York, have invented certain new and useful Improvements in Cooking Apparatus, of which the following is a full and complete specification, such as will enable those skilled in the art to which it appertains to make and use the same.

This invention relates to cooking apparatus; and the object thereof is to provide means whereby frying-pans, broilers, and other cooking utensils may be movably supported in connection with a stove or other heater and oscillated to insure an even and thorough cooking of the contents thereof.

The invention consists in the construction and arrangement of parts hereinafter specified.

In the accompanying drawings, forming part of this specification, in which like reference characters denote corresponding parts in the several views, Figure 1 is a side elevation of a cooking apparatus constructed according to my invention, the support thereof being broken away at the lower portion. Fig. 2 is a side elevation thereof; Figs. 3, 4, 5, 6, 7, 8, 9, and 10, views of details of the operating elements of my improved apparatus, and Figs. 11, 12, 13, 14, and 15 views of cooking utensils which are particularly adapted for the purpose in view.

In the practice of my invention I provide a standard 20, which is connected with or supported adjacent a stove or other heater and is provided with a main upright 21, a supplemental upright portion 22, and a longitudinally-extended member 23, connected with the main upright 21. Journaled in the uprights 21 and 22 is a main shaft 24, provided adjacent one end with a loosely-mounted drum 25, upon which is wound a cord or other flexible device 26, one end of which is fixed to said drum and the other end of which is provided with a weight 27, which may be detached to allow the substitution of weights of varying mass. The outer end of the shaft 24 is provided with a fixed ratchet 28, and pivoted to the drum 25 is a pawl 29, which operates in connection with said ratchet.

A hand-wheel 30 is loosely mounted upon the extreme outer end of the shaft 24 and keyed to the drum 25 at 31, whereby said drum may be turned upon the shaft to wind up the cord 26 thereon. A friction-governor 32 (shown in Figs. 7 and 8) is mounted upon the shaft 24 and comprises a fixed portion $32^a$, which is locked to the upright 22 by a collar $32^b$, and a rotating portion $32^c$, which is fixed to the shaft 24 and provided with slidable peripheral shoes $32^d$, which operate in connection with the fixed member $32^a$ in the customary manner to brake the shaft 24.

Mounted upon the shaft 24 are a pair of gears 33 and 34, one of which, 33, is loose, and said gears are shown, respectively, in Figs. 3 and 4 and 5 and 6. The gear 33 is provided with a concentric lateral member $33^a$ of diminished diameter, and the gear 34 is provided with a peripheral interiorly-toothed flange $34^a$.

The main upright 21 is provided with a lateral depending bracket 35, which carries at its lower end a short shaft 36, provided at either end with a pinion, respectively, 37 and 38, and the shaft 36 is loosely mounted in the bracket 35. The pinion 38 operates in connection with the toothed member $33^a$ of the gear 33, and the pinion 37 meshes with the interiorly-toothed flange $34^a$ of the gear 34. The teeth of the gears 33 and 34 are arranged relatively alternately, for a purpose hereinafter explained, and it is evident that the gears 33 and 34 will be rotated in opposite directions by means of the relative arrangement of the teeth of the flange $34^a$ of the gear 34 and the lateral member $33^a$ of the gear 33, one of said sets of teeth being exterior and the other interior of the respective gear element.

The longitudinal member 23 of the main upright 21 is provided at each end with a pair of laterally-directed rollers 39, and mounted between said rollers is a reciprocating bar 40, which is provided with a pair of laterally-arranged racks 41, which operate, respectively, in connection with the gears 33 and 34 to cause reciprocation of the bar 40, and the reciprocation thereof is caused by the relatively-alternate arrangement of the teeth of said gears. A pair of shafts 42 are loosely mounted in the longitudinal extension 23 of the upright 21, as clearly shown in Figs. 1 and 2, and to each of said shafts is attached the cooking utensil, one of which is shown in Fig. 1 and consists of a frier 43. The inner ends of the shafts 42 are provided with upwardly-directed arms 44, and the bar 40 is provided at predetermined points with two depending fingers 45, which operate, in connection with said arms 44, upon reciprocation of the bar 40 to oscillate the shafts 42 and the cooking utensil 43, connected therewith. The frier 43 is shown in detail in Figs. 11, 12, and 13, Fig. 11 being an end view thereof, Fig. 12 a plan view thereof, Fig. 13 a side view thereof, Fig. 14 a plan view of a broiler, and Fig. 15 an edge view of a portion thereof, showing the construction in Fig. 14.

In Fig. 14 is shown a foraminated construction 45, which comprises the broiler-body proper and is provided at its outer edge with chains or link devices 46, which operate in connection with hooks 47, formed upon the other portion or half of the broiler-body, and whereby articles of varying bulk may be securely gripped between the sides of the broiler-body.

The operation of my improved cooking apparatus will be evident from the foregoing description when taken in connection with the accompanying drawings.

The hand-wheel 30 may be operated as desired to wind up the cord 26 upon the drum 25, and the weight 27, causing said cord to unwind, rotates the shaft 24 and the gears 33 and 34, which gears are connected by means of the pinions 37 and 38, and as one of said gears is loosely mounted upon the shaft 24 said gears are reversely and alternately operated, whereby the bar 40 is caused to reciprocate upon its roller-supports 39 and in its reciprocation rocks the shafts 42, by means of the arms 44 thereof, oscillating the frier 43 or other cooking utensil above the fire in the stove or other heater and causing an even cooking and "basting" of the contents of the frier or other cooking-receptacle.

I do not limit myself to the specific construction and arrangement of parts herein specified, but reserve the right to vary the same within the scope of my invention.

Having fully described my invention, I claim as new and desire to secure by Letters Patent—

1. A cooking apparatus of the class described adapted to be connected with or arranged adjacent a stove or other heater, comprising a frame, a main shaft journaled therein, means for operating the same, a pivotal cooking-utensil support operatively mounted in said frame, a reciprocating element operatively mounted in said frame and arranged to operate in connection with said pivotal cooking-utensil support, said reciprocating element being provided with a pair of racks, a fixed gear and a loose gear mounted upon said main shaft and arranged to operate respectively in connection with said racks, said fixed and loose gears being operatively connected, and the relative arrangement and construction thereof being such that said racks are alternately and reversely operated thereby, substantially as shown and described.

2. A cooking apparatus of the class described, comprising a frame, a main shaft journaled therein, means for operating said main shaft, a pair of gears mounted upon said main shaft, one of which is fixed and the other of which is loose, said gears being so operatively connected that when said fixed gear is turned by said main shaft, said loose gear will be turned in the opposite direction, a reciprocating element mounted in said main frame and provided with racks which operate in connection with said gears, and a cooking-utensil support pivotally mounted in said frame and arranged to operate in connection with said reciprocating element, substantially as shown and described.

3. A cooking apparatus of the class described, comprising a frame, a main shaft journaled therein, means for operating said main shaft, a pair of gears mounted upon said main shaft, one of which is fixed and the other of which is loose, said gears being so operatively connected that when said fixed gear is turned by said main shaft, said loose gear will be turned in the opposite direction, a reciprocating element mounted in said main frame provided with racks which operate in connection with said gears, a cooking-utensil support pivotally mounted in said frame and arranged to operate in connection with said reciprocating element, and said main shaft being provided with a governor, substantially as shown and described.

4. A cooking apparatus of the class described, comprising a main frame, a main shaft journaled therein, means for turning said main shaft in a constant direction, a pair of gears mounted upon said main shaft, one of which is fixed thereto, and the other of which is loosely mounted thereon, one of said gears being provided with internal supplemental teeth, the other of said gears being provided with external supplemental teeth, a bracket connected with said frame and provided with a loosely-mounted shaft carrying pinions which operate respectively in connection with said internal and said external supplemental teeth, a reciprocating element mounted in said frame and provided with racks in connection with which said gears respectively operate, the teeth of said gears being relatively alternately arranged, and a rocking cooking-receptacle support which is mounted in said frame and in connection with which said reciprocating element operates, substantially as shown and described.

5. A cooking apparatus of the class described, comprising a frame, a main shaft journaled therein and provided with a loosely-mounted drum and a fixed ratchet, said drum being provided with a pivoted pawl which operates in connection with said ratchet, a flexible device one end of which is connected with said drum and which is arranged to be wound upon said drum and is provided at its free end with a weight, a pivotal cooking-utensil support operatively mounted in said frame, a reciprocating element operatively mounted in said frame and arranged to operate in connection with said pivotal cooking-utensil support, said reciprocating element being provided with a pair of racks, a fixed gear and a loose gear mounted upon said main shaft and arranged to operate respectively in connection with said racks, said fixed and loose gears being operatively connected, and the relative arrangement and construction thereof being such that said racks are alternately reversely operated thereby, substantially as shown and described.

In testimony that I claim the foregoing as my invention I have signed my name, in presence of the subscribing witnesses, this 11th day of January, 1900.

SAML. EDGAR SNEDEKER.

Witnesses:
JAS. W. BIRCH,
Mrs. J. W. BIRCH.